(12) United States Patent
Egger et al.

(10) Patent No.: US 10,011,068 B2
(45) Date of Patent: Jul. 3, 2018

(54) METHOD FOR PRODUCING A PLASTIC CONTAINER

(71) Applicant: MAGNA STEYR Fuel Systems GesmbH, Sinabelkirchen (AT)

(72) Inventors: Maris Egger, Markt Hartmannsdorf (AT); Manuel Farmer, Weitendorf (AT); Michael Mayrhofer, Pischelsdorf (AT); Christian Urdl, Eisbach (AT)

(73) Assignee: MAGNA STEYR Fuel Systems GesmbH, Sinabelkirchen (AT)

( * ) Notice: Subject to any disclaimer, the term of this patent is extended or adjusted under 35 U.S.C. 154(b) by 642 days.

(21) Appl. No.: 14/293,361

(22) Filed: Jun. 2, 2014

(65) Prior Publication Data

US 2014/0361461 A1    Dec. 11, 2014

(30) Foreign Application Priority Data

Jun. 5, 2013    (EP) .................... 13170552

(51) Int. Cl.
*B29C 51/02*    (2006.01)
*B29C 65/78*    (2006.01)
(Continued)

(52) U.S. Cl.
CPC ............ *B29C 51/02* (2013.01); *B29C 65/028* (2013.01); *B29C 65/7855* (2013.01); *B29C 66/124* (2013.01); *B29C 66/1312* (2013.01); *B29C 66/54* (2013.01); *B29C 66/61* (2013.01); *B29D 22/003* (2013.01); *B60K 15/03177* (2013.01); *B29C 51/10* (2013.01); *B29C 51/12* (2013.01); *B29C 51/267* (2013.01); *B29C 65/48* (2013.01); *B29C 65/562* (2013.01); *B29C 65/58* (2013.01); *B29C 66/71* (2013.01); *B29C 66/73921* (2013.01); *B29C 69/004* (2013.01);
(Continued)

(58) Field of Classification Search
CPC ......... B29C 51/26; B29C 65/02; B29C 51/02; B29C 65/028; B29C 65/7855; B29C 66/124; B29C 66/1312; B29C 66/54; B29C 66/61; B29D 22/00; B29D 22/003; B60K 15/03177
See application file for complete search history.

(56) References Cited

U.S. PATENT DOCUMENTS 4,952,347 A    8/1990  Kasugai
6,338,420 B1   1/2002  Pachciarz et al.
(Continued)

FOREIGN PATENT DOCUMENTS

CN    101080310 A    11/2007
DE    102011015049 A1    9/2012
(Continued)

OTHER PUBLICATIONS

Office Action received for Chinese Patent Application No. 201410238495.1, dated Jan. 20, 2016, 10 pages including 5 pages of English translation.

*Primary Examiner* — Jacob T Minskey
*Assistant Examiner* — Melody Tsui
(74) *Attorney, Agent, or Firm* — Jordan IP Law, LLC; Todd A. Vaughn

(57) ABSTRACT

A method for producing a plastic container from a first plastic half-shell and a second plastic half-shell, with a first attachment permanently fastened to the first plastic half-shell.

20 Claims, 4 Drawing Sheets

(51) Int. Cl.
- *B29C 65/00* (2006.01)
- *B29D 22/00* (2006.01)
- *B29C 65/02* (2006.01)
- *B60K 15/03* (2006.01)
- *B29L 31/00* (2006.01)
- *B29C 65/48* (2006.01)
- *B29C 65/56* (2006.01)
- *B29C 65/58* (2006.01)
- *B29C 69/00* (2006.01)
- *B29C 51/10* (2006.01)
- *B29C 51/26* (2006.01)
- *B29L 31/30* (2006.01)
- *B29K 23/00* (2006.01)
- *B29C 51/12* (2006.01)

(52) U.S. Cl.
CPC . *B29K 2023/065* (2013.01); *B29L 2031/3055* (2013.01); *B29L 2031/712* (2013.01); *B29L 2031/7172* (2013.01); *B29L 2031/7496* (2013.01); *B60K 2015/03032* (2013.01); *B60K 2015/0346* (2013.01); *B60K 2015/03243* (2013.01); *B60K 2015/03453* (2013.01)

(56) References Cited

U.S. PATENT DOCUMENTS

| | | | | |
|---|---|---|---|---|
| 6,712,234 B2 * | 3/2004 | Boecker | F02M 37/103 | 220/4.13 |
| 6,978,802 B2 * | 12/2005 | Hagano | B29C 49/20 | 137/560 |
| 7,455,190 B2 * | 11/2008 | Potter | B60K 15/03177 | 220/4.12 |
| 8,658,079 B2 * | 2/2014 | Criel | B29C 49/20 | 264/516 |
| 8,663,544 B2 * | 3/2014 | Criel | B29C 49/20 | 220/4.14 |
| 9,027,781 B2 * | 5/2015 | Criel | B60K 15/03177 | 220/562 |
| 9,266,285 B2 * | 2/2016 | Tabuchi | B29C 51/12 | |
| 9,358,742 B2 * | 6/2016 | Criel | B29C 51/12 | |
| 9,440,403 B2 * | 9/2016 | Criel | B29C 51/12 | |
| 9,452,577 B2 * | 9/2016 | Criel | B29C 65/028 | |
| 2003/0102033 A1 * | 6/2003 | Dasilva | F02M 37/0082 | 137/565.17 |
| 2012/0006476 A1 * | 1/2012 | Criel | B29C 65/028 | 156/245 |

FOREIGN PATENT DOCUMENTS

| | | |
|---|---|---|
| EP | 2497622 A2 | 9/2012 |
| FR | 2879122 A1 | 6/2006 |

* cited by examiner

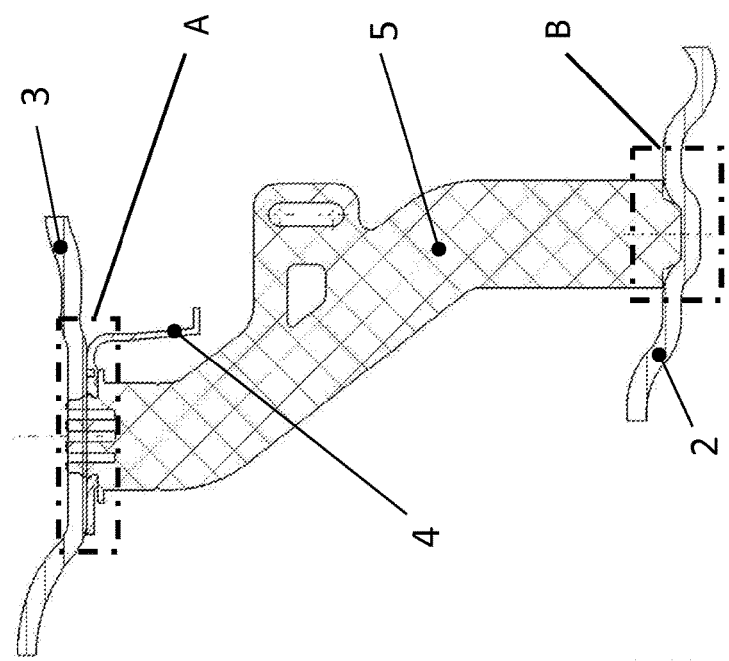
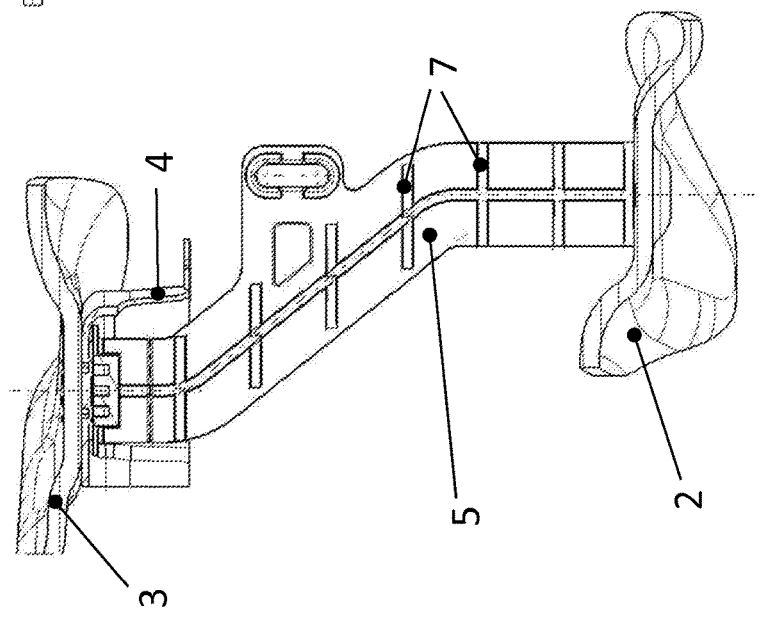
Fig. 7
Fig. 6

METHOD FOR PRODUCING A PLASTIC CONTAINER

CROSS-REFERENCE TO RELATED APPLICATIONS

The present application claims priority 35 U.S.C. § 119 to European Patent Publication No. EP 13170552.7 (filed on Jun. 5, 2013) which is hereby incorporated by reference in its entirety.

TECHNICAL FIELD

Embodiments relate to a method for producing a plastic container from a first plastic half-shell and a second plastic half-shell, with a first attachment permanently fastened to the first plastic half-shell.

BACKGROUND

Plastic containers may be used in particular as fuel tanks for motor vehicles. A known production method for such plastic containers includes producing by thermoforming, for example, initially lower, plastic half-shells, and then upper, plastic half-shells, and then subsequently welding the two heated plastic half-shells at their edges to form a closed container.

In the production of such plastic containers, it is also known to fasten attachments, such as for instance fuel pumps and lever-type sensors, in the respective plastic half-shells already before the welding of the plastic half-shells.

Depending on the application of the plastic container and the attachments, it is sometimes necessary that specific attachments must be fastened to a specific one of the two plastic half-shells, for example, in order that a lever-type sensor is arranged in a fuel tank in such a way that it has reference to the ground.

SUMMARY

Embodiments relate to a method for producing a plastic container from a first plastic half-shell and a second plastic half-shell, with a first attachment permanently fastened to the first plastic half-shell, that is inexpensive and efficient.

Embodiments relate to a method for producing a plastic container from a first plastic half-shell and a second plastic half-shell, with a first attachment permanently fastened to the first plastic half-shell, wherein: the first plastic half-shell and the second plastic half-shell are moulded, the first attachment is fastened at least for a time to the second plastic half-shell, the first attachment having a strut, the strut being formed such that one end of the strut lies in a contact region that is intended for contact with the first plastic half-shell, and the first plastic half-shell is welded to the second plastic half-shell, the end of the strut being welded to the first plastic half-shell in the contact region.

In accordance with embodiments, the fact that the attachment has at least one strut, the end of which reaches to the opposite plastic half-shell, makes it possible for an attachment that has to be fastened to a specific one of the two plastic half-shells to be fixed initially, for example only temporarily, to the other plastic half-shell, in order that it is only during the welding of the two plastic half-shells that the attachment is also fastened permanently by way of its strut to the "correct" plastic half-shell.

Depending on other circumstances in the production method, it may be much more efficient and inexpensive not to fasten an attachment to the required, first plastic half-shell but instead to fasten it, for example temporarily, to the other, second plastic half-shell and to bring about the required connection of the attachment to the first plastic half-shell only in the course of the welding of the half-shells to one another, as an additional benefit and involving virtually no further effort.

The fastening of the attachment to the second plastic half-shell, at least for a time, may be performed, for example, by clipping in, adhesive bonding, screwing or welding.

In accordance with embodiments, it goes without saying that it may be provided that an attachment also has two or more struts formed in this way, which are initially fastened to the second plastic half-shell, but ultimately to the first plastic half-shell.

In accordance with embodiments, the first plastic half-shell and the second plastic half-shell may be moulded by heating and thermoforming.

In accordance with embodiments, the attachment may be in particular a fuel pump, a feed module or a lever-type sensor.

In accordance with embodiments, the first plastic half-shell and the second plastic half-shell may bewelded, in particular thermoplastically welded, at their peripheral edges.

In accordance with embodiments, the strut may be thermoplastically welded to the first plastic half-shell.

In accordance with embodiments, the strut and the first plastic half-shell may be composed of the same material, such as, for example, High-Density Polyethylene (HDPE).

In accordance with embodiments, a second attachment may be permanently fastened to the second plastic half-shell. In this case, there is in addition to the attachment which is to be fastened to the first plastic half-shell a second attachment, which is to be fastened to the other of the two half-shells. The use in accordance with the invention of a strut makes it possible to fit both attachments initially onto the same plastic half-shell.

In accordance with embodiments, the first attachment and the second attachment may be fastened to the second plastic half-shell with the same gripping tool. Since, in accordance with embodiments, both attachments are fitted onto the same half-shell, the efficient use of the same gripping tool is also easily possible.

In accordance with embodiments, the strut may have a predetermined breaking point, which is designed such that the strut of the plastic container breaks at the predetermined breaking point before the plastic half-shells are damaged, in order to avoid damage to the plastic container under unusual loads. The predetermined breaking point may be designed such that a seating of the first attachment on the first plastic half-shell is retained even if the strut breaks at the predetermined breaking point.

In accordance with embodiments, a method for producing a plastic container may include at least one of: moulding a first plastic half-shell and a second plastic half-shell, the first plastic half-shell having a first attachment permanently fastened thereto, the first attachment having a strut formed such that one end thereof lies in a contact region that is to contact the first plastic half-shell; fastening the first attachment via the strut at least temporarily to the second plastic half-shell; and welding the first plastic half-shell to the second plastic half-shell, and the end of the strut to the first plastic half-shell in the contact region.

In accordance with embodiments, a method for producing a container may include at least one of: moulding a first half-shell composed of a plastic material and a second half-shell composed of a plastic material; fastening a strut to extend between the first half-shell and the second half-shell, the strut having a plurality of predetermined breaking points which are respectively configured such that the strut breaks before damage occurs to at least one of the first half-shell and the second half-shell under loads, the strut being connected to the first half-shell at a first contact region and to the second half-shell at a second contact region; and connecting the first half-shell to the second half-shell.

DRAWINGS

Embodiments will be illustrated by way of example in the drawings and explained in the description below.

FIGS. 1 to 4 illustrate a method for the production of a plastic container with an attachment.

FIG. 5 schematically illustrates a plastic container produced in accordance with embodiments.

FIGS. 6 and 7 illustrate sectional representations of a strut of a plastic container produced in accordance with embodiments.

DESCRIPTION

As illustrated in FIGS. 1-4, a method for producing a plastic container with an attachment, as already known, are represented.

Figure 1:
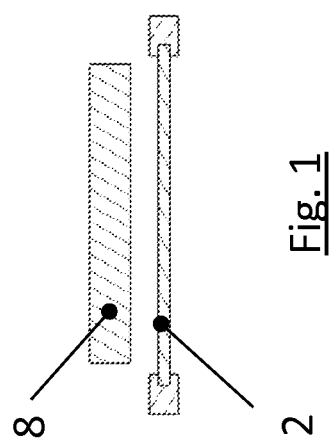

As illustrated in FIG. 1, a sheet of plastic, which may be used as a first plastic half-shell 2, is heated by a heating element 8. This heating may be performed in two separate mould halves, one for an upper forming part and one for a lower forming part, only one of the two mould halves being represented in FIG. 1.

Figure 2:
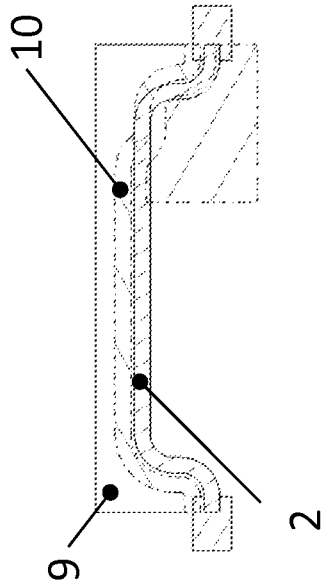

As illustrated in FIG. 2, the heated first plastic half-shell 2 is given a desired form by the mould contour 10 of the mould 9, for example, by application of a vacuum.

Figure 3:
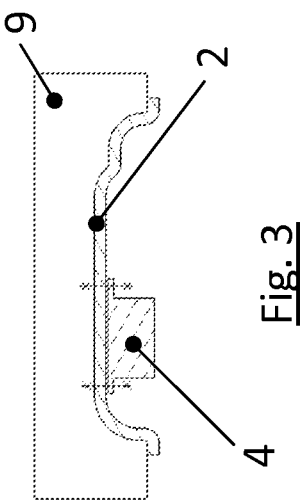

As illustrated in FIG. 3, the moulded plastic half-shell 2 is finally fitted with an attachment 4, for example, by screwing on or adhesive bonding.

Figure 4:
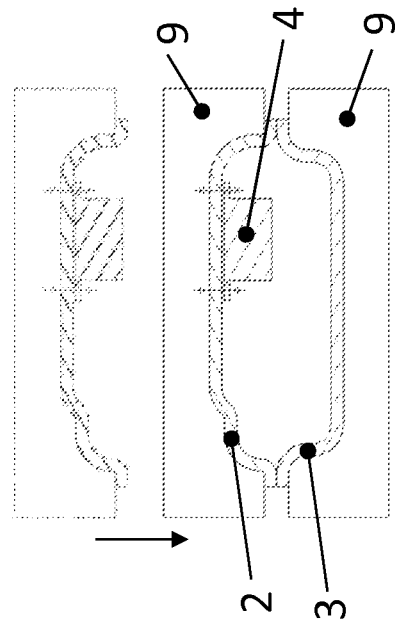

As illustrated in FIG. 4, then, an upper plastic half-shell 2 and a lower plastic half-shell 3 are pressed against one another and thus welded at their edges, which become weld seams. The mould half that is at the top, with the first plastic half-shell 2, is pressed in the direction of the arrow onto the lower mould half, with the second plastic half-shell 3.

Figure 5:
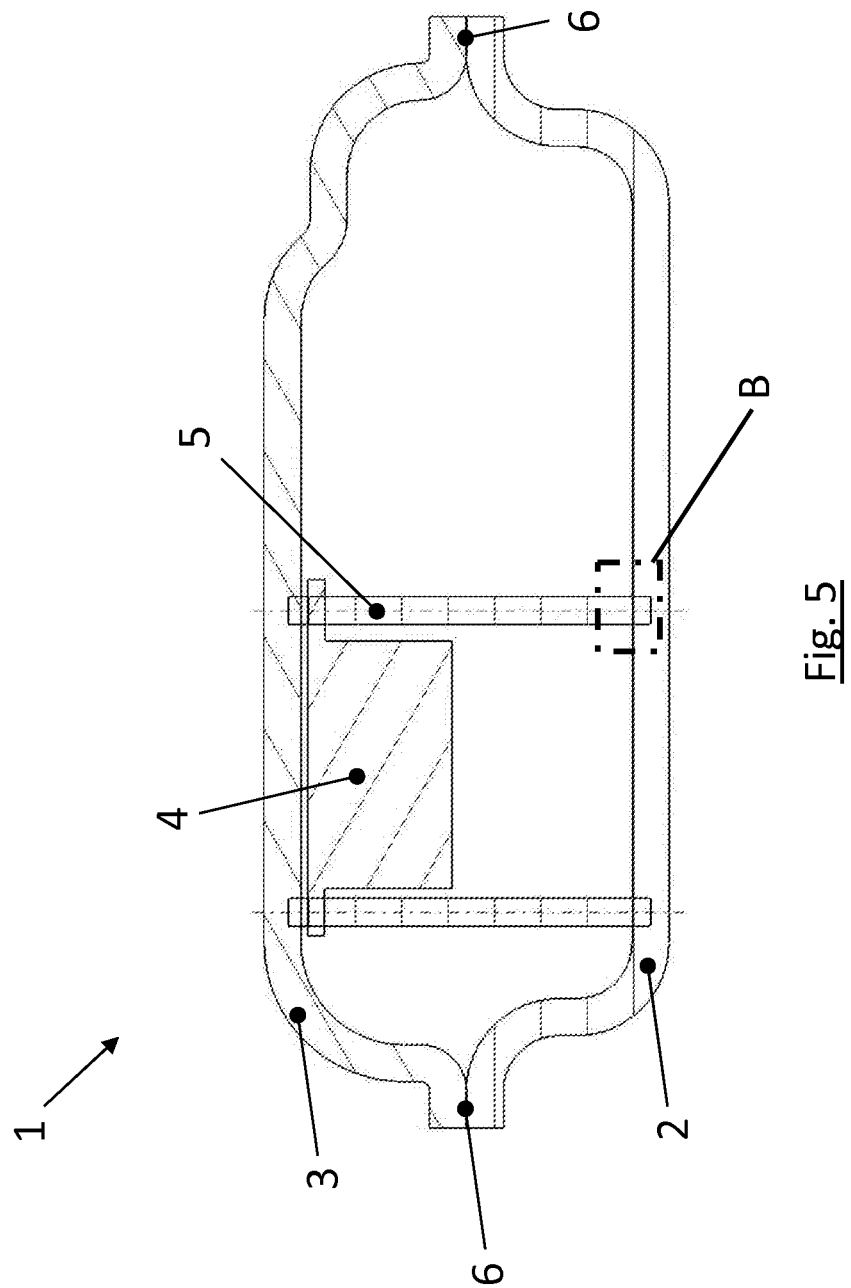

As illustrated in FIG. 5, a plastic container 1 produced in accordance with provided, which differs from a plastic container produced by the known method in that the attachment 4 has at least one strut 5, in the embodiment illustrated two struts 5. The strut(s) 5 may be pre-fixed on the second plastic half-shell 3 (in this representation at the top in the image), for example, by clipping in, welding in or the like. The strut(s) 5, however, also reach to the first plastic half-shell 2 (at the bottom in FIG. 5) and are thermoplastically welded there to the first plastic half-shell 2, in the contact region B, in the course of the welding of the two half-shells 2, 3. This makes it possible in the production of the container 1 to place in the second plastic half-shell 3 or the first plastic half-shell 2 an attachment that is intended to be fixed in the first plastic half-shell 2 or the second plastic half-shell 3.

Figure 8:
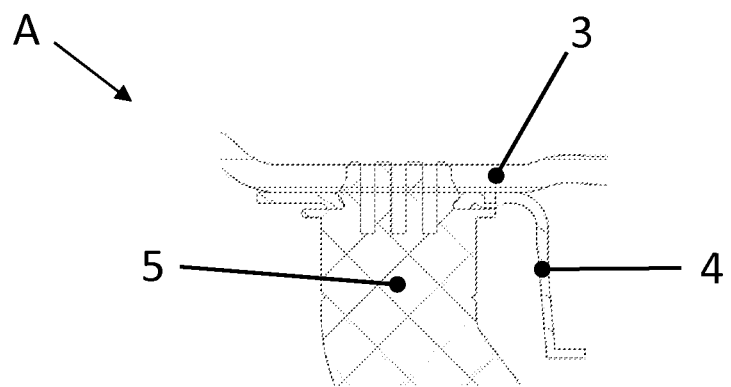
FIGS. 8 and 9 illustrate partial representations of contact regions A and B from FIG. 7.
Figure 9:
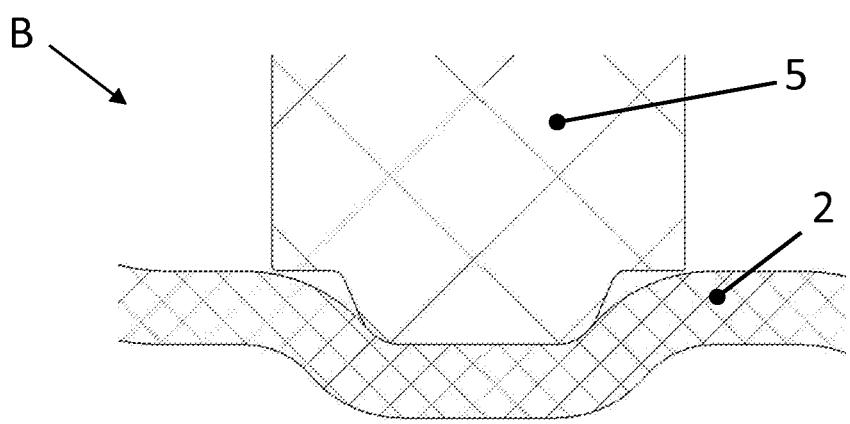

As illustrated in FIGS. 6 and 7, provided is a strut 5 on a feed module as an attachment 4 of a plastic container 1 produced in accordance embodiments, and which corresponds to FIG. 5. The strut 5 has predetermined breaking points 7, for the protection of the plastic half-shells 2, 3 under loads. The contact region A, in which the strut 5 is at least temporarily fixed to the second plastic half-shell 3, is represented more specifically in FIG. 8. The contact region B, in which the strut 5 is welded to the first plastic half-shell 2, is represented more specifically in FIG. 9.

In accordance with embodiments, the use of struts on attachments makes it possible to weld on in the second forming part (second plastic half-shell) attachments that have to be welded on in the first forming part (first plastic half-shell), and vice versa. In particular, attachments can be fitted onto the first forming part and onto the second forming part with only one gripper in the forming parts.

In accordance with embodiments, the method for producing a plastic container from a first plastic half-shell and a second plastic half-shell, with a first attachment permanently fastened to the first plastic half-shell, is therefore efficient and inexpensive.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS 1 plastic container
2 first plastic half-shell
3 second plastic half-shell
4 attachment
5 strut
6 peripheral edges
7 predetermined breaking point
8 heating element
9 mould
10 mould contour
A contact region
B contact region

What is claimed is:

1. A method for producing a fuel tank for a motor vehicle, the method comprising:
   permanently connecting one of a fuel pump, a feed module, or a sensor, to a first plastic half-shell via a strut formed such that one end thereof lies in a first contact region that is to contact the first plastic half-shell and a second end that is to lie in a second contact region that is to contact a second plastic half-shell, the strut having a plurality of predetermined breaking points spaced apart along the length of the strut and configured to permit retention of the one of the fuel pump, the feed module, or the sensor on the first plastic half-shell, and temporarily connecting the one of the fuel pump, the feed module, or the sensor, via the strut by clipping or adhesive bonding to the second plastic half-shell at the second contact region; and welding the first plastic half-shell to the second plastic half-shell, and the end of the strut to the first plastic half-shell in the first contact region.

2. The method of claim 1, further comprising, prior to permanently connecting one of the fuel pump, the feed module, or the sensor:

moulding the first plastic half-shell and the second plastic half-shell by heating and thermoforming.

3. The method of claim 1, wherein welding the first plastic half-shell to the second plastic half-shell comprises thermoplastically welding the first plastic half-shell to the second plastic half-shell at peripheral edges thereof.

4. The method of claim 1, wherein the strut is thermoplastically welded to the first plastic half-shell.

5. The method of claim 1, wherein the strut and the first plastic half-shell are composed of the same material.

6. The method of claim 5, wherein the same material comprises high-density polyethylene.

7. A method for producing a fuel tank for a motor vehicle, the method comprising:

moulding a first plastic half-shell composed of a plastic material and a second plastic half-shell composed of a plastic material;

permanently connecting, by weld at a first contact region, an attachment that includes a fuel pump, a feed module, or a sensor to the first plastic half-shell via a strut such that the strut is to extend between the first plastic half-shell at the first contact region and the second plastic half-shell at a second contact region, the strut having a plurality of predetermined breaking points spaced apart along the length of the strut and configured such that the strut is to break at a respective one of the breaking points to permit retention of the attachment on the first plastic half-shell, and temporarily connecting, by clipping or adhesive bonding at the second contact region, the attachment to the second plastic half-shell; and permanently connecting the first plastic half-shell to the second plastic half-shell.

8. The method of claim 7, wherein moulding the first plastic half-shell and the second plastic half-shell comprises moulding the first plastic half-shell and the second plastic half-shell by heating and thermoforming.

9. The method of claim 7, wherein permanently connecting the first plastic half-shell to the second plastic half-shell comprises thermoplastically welding the first plastic half-shell to the second plastic half-shell at peripheral edges thereof.

10. The method of claim 7, wherein the strut and the first plastic half-shell are composed of the same material.

11. The method of claim 10, wherein the same material comprises high-density polyethylene.

12. A method for producing a fuel tank for a motor vehicle, the method comprising:

permanently connecting one of a fuel pump, a feed module, or a sensor to the first plastic half-shell via a strut such that the strut is to extend between the first plastic half-shell at a first contact region and the second plastic half-shell at a second contact region, the strut having a plurality of predetermined breaking points spaced apart along the length of the strut and configured such that the strut is to break at a respective one of the breaking points to permit retention of the one of the fuel pump, the feed module, or the sensor on the first plastic half-shell, and temporarily connecting the strut to the second plastic half-shell at the second contact region; and permanently connecting the first plastic half-shell to the second plastic half-shell.

13. The method of claim 12, further comprising, prior to permanently connecting one of the fuel pump, the feed module, or the sensor:

moulding the first plastic half-shell and the second plastic half-shell by heating and thermoforming.

14. The method of claim 12, wherein permanently connecting the first plastic half-shell to the second plastic half-shell comprises thermoplastically welding the first plastic half-shell to the second plastic half-shell at peripheral edges thereof.

15. The method of claim 12, wherein the strut and the first plastic half-shell are composed of the same material.

16. The method of claim 15, wherein the same material comprises high-density polyethylene.

17. The method of claim 1, wherein the welding of the first plastic half-shell to the second plastic half-shell and the welding of the end of the strut to the first plastic half-shell in the first contact region are performed at a substantially same time.

18. The method of claim 7, wherein the first plastic half-shell and the second plastic half-shell are permanently connected to each other at a substantially same time the attachment is permanently connected, by weld, to the first plastic half-shell via the strut.

19. The method of claim 12, wherein the first plastic half-shell and the second plastic half-shell are permanently connected to each other at a substantially same time the one of the fuel pump, the feed module, or the sensor is permanently connected to the first plastic half-shell via the strut.

20. The method of claim 1, wherein the one of the fuel pump, the feed module, or the sensor is temporarily connected, via the strut, to the second plastic half-shell at the second contact region before the one of a fuel pump, a feed module, or a sensor is permanently connected, via the strut, to the first plastic half-shell at the first contact region.

* * * * *